United States Patent
Koehn

(10) Patent No.: US 11,909,153 B1
(45) Date of Patent: Feb. 20, 2024

(54) SAFETY CAP DEVICE

(71) Applicant: Joshua Koehn, Stockton, CA (US)

(72) Inventor: Joshua Koehn, Stockton, CA (US)

(*) Notice: Subject to any disclaimer, the term of this patent is extended or adjusted under 35 U.S.C. 154(b) by 389 days.

(21) Appl. No.: 17/351,815

(22) Filed: Jun. 18, 2021

(51) Int. Cl.
*H01R 4/22* (2006.01)
*H01R 4/48* (2006.01)

(52) U.S. Cl.
CPC ............ *H01R 4/22* (2013.01); *H01R 4/4863* (2013.01)

(58) Field of Classification Search
CPC .................................. H01R 4/22; B25B 7/02
See application file for complete search history.

(56) References Cited

U.S. PATENT DOCUMENTS

| | | | | |
|---|---|---|---|---|
| 4,647,717 A * | 3/1987 | Uken | ...................... | H01R 4/22 174/76 |
| 4,802,263 A | 2/1989 | Lorber | | |
| 4,870,876 A * | 10/1989 | Rodriquez | ............. | H01R 43/00 81/426.5 |
| 5,023,401 A | 6/1991 | Clifton | | |
| 5,893,303 A * | 4/1999 | Harris | ...................... | B25B 7/00 81/415 |
| 9,225,155 B1 * | 12/2015 | Rauckman | ........... | H01R 13/447 |
| 2009/0007734 A1 * | 1/2009 | Lulewicz | .................. | B25B 7/00 81/415 |
| 2011/0167612 A1 * | 7/2011 | Marshall | .................. | B25B 7/02 29/237 |

* cited by examiner

*Primary Examiner* — Chau N Nguyen
(74) *Attorney, Agent, or Firm* — Sanchelima & Associates, P.A.; Christian Sanchelima; Jesus Sanchelima

(57) ABSTRACT

A safety cap device includes a flexible cylindrical cap formed of material of low conductivity such as rubber. Additionally, the device includes a spring biased clip is integrated on the open end of the cap such that the clip is used to clip about a wire and hold the cap over the end of said wire. In one embodiment, the clip retains the cap in a closed position by the tension of the spring in its relaxed stated. The clip is then compressed which then in turn compresses the spring to engage the cap in an open position. The cap is then mounted onto exposed electrical wiring which will provide protection to a user working with the exposed wiring. A user utilizes the cap as a handle which prevents direct contact with the exposed wiring.

1 Claim, 3 Drawing Sheets

SAFETY CAP DEVICE

BACKGROUND OF THE INVENTION

1. Field of the Invention

The present invention relates to a safety cap device and, more particularly, to a system for a safety cap device that clips onto exposed electrical wires and prevents users from directly touching the exposed electrical wires.

2. Description of the Related Art

Several designs for a safety cap device have been designed in the past. None of them, however, include a safety cap device comprising a flexible cylindrical cap formed of material of low conductivity such as rubber. Additionally, the device includes a spring biased clip is integrated on the open end of the cap such that the clip is used to clip about a wire and hold the cap over the end of said wire. In one embodiment, the clip retains the cap in a closed position by the tension of the spring in its relaxed stated. The clip is then compressed which then in turn compresses the spring to engage the cap in an open position. The cap is then mounted onto exposed electrical wiring which will provide protection to a user working with the exposed wiring. A user utilizes the cap as a handle which prevents direct contact with the exposed wiring. It is known that traditional wire caps require a user to directly touch the cap while mounting it onto exposed electrical wiring. This may cause potential electrical accidents to electrical workers when mounting the caps on exposed wiring. Therefore, there is a need for a safety device cap which introduces a clip mechanism that prevents a user from directly touching the exposed electrical wiring to be covered. The clip will expand and retract the cap for the user and serve as a handle when mounting the cap onto exposed electrical wiring.

Applicant believes that a related reference corresponds to U.S. Pat. No. 4,802,263 issued for a clipping apparatus. The cited reference discloses a device for the detachable clipping of paper sheets which contains an approximately U-shaped clip with longs ends forming longitudinal edges. Applicant believes that another related reference corresponds to U.S. Pat. No. 5,023,401 issued for a twist-on terminal for electrical wires. The cited reference discloses a twist-on type spring connector which includes a tapered coiled spring secured within a molded insulative shell having detachable wings. However, the cited references differ from the present invention because they fail to disclose a safety ap device having a flexible cylindrical cap formed of rubber and a spring biased clip that is integrated on the open end of the cap. The clip is then used to clip about a wire and retain the cap over the end of the wire.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a safety cap device that protects workers and electrical equipment from harm associated with exposed wire ends.

It is another object of this invention to provide a safety cap device which features an electrical wire safety hood and helps to prevent electrical accidents and injuries.

It is still another object of the present invention to provide a safety cap device which can be easily removed when needed for wire testing or connection. Additionally, the device eliminates the need to use sticky electrical tape for covering exposed wires.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
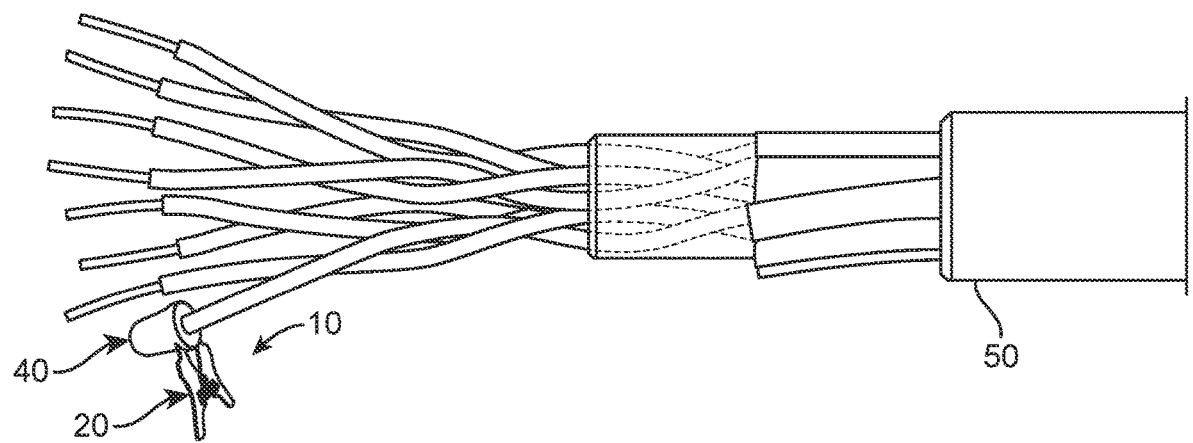
FIG. 1 represents an operational isometric view of safety cap device 10 mounted to electrical wiring in accordance to an embodiment of the present invention.

Referring now to the drawings, where the present invention is generally referred to with numeral 10, it can be observed a system for a safety cap device 10 which basically includes a clip assembly 20 and a cap assembly 40.

Figure 2:
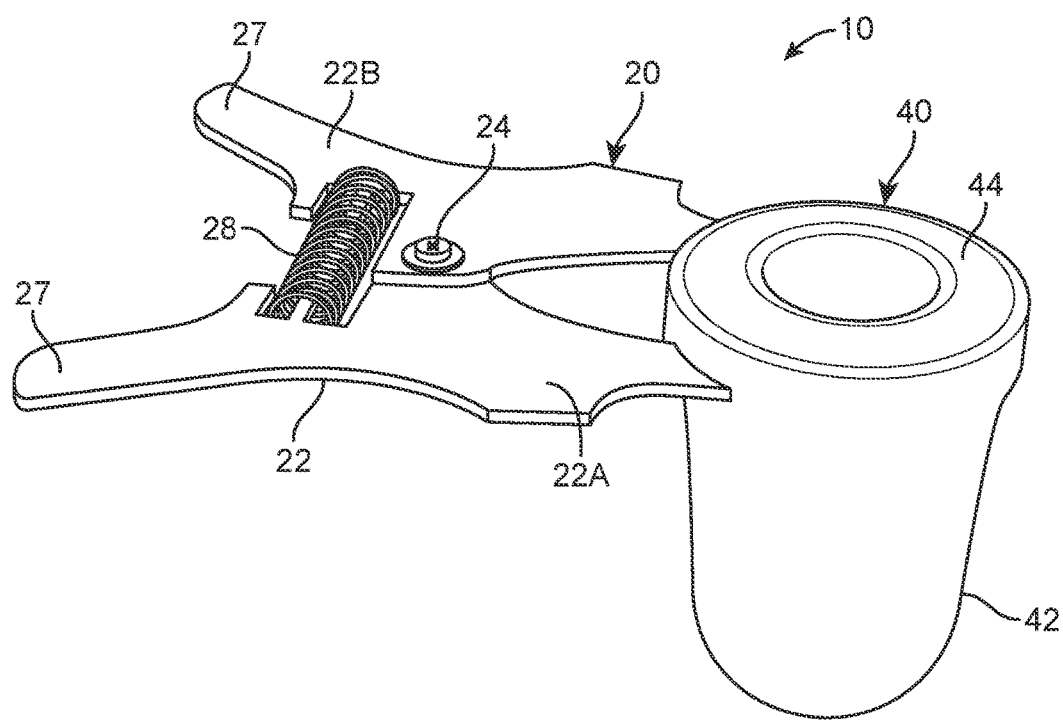
FIG. 2 shows an isometric view of safety cap device 10 depicting clip assembly 20 and cap assembly 40 in accordance to an embodiment of the present invention.

Clip assembly 20 includes a clip 22 which includes a first section 22A and a second section 22B. In one embodiment, clip 22 is provided as a flat structure which may be positioned to have an "X"-shaped configuration. Further, clip 22 may be made of a material which features low conductivity of electricity. As a result, clip 22 may be made of a strong plastic material. This will prevent any electricity from being transferred to a user thereby causing electrical harm to an operator of the safety cap device. Additionally, second section 22B may overlap first section 22A at a middle portion. The first section 22A and second section 22B are then joined together by a hinged connection 24. As observed in FIG. 2, hinged connection 24 may be provided as a screw which has been threadably inserted at the connection point of first section 22A and second section 22B. Clip 22 may further include concave outer portions which cave inwardly within the structure of the clip. The concave portions enable for the proper gripping of a user operating the safety cap device 10.

Figure 5:
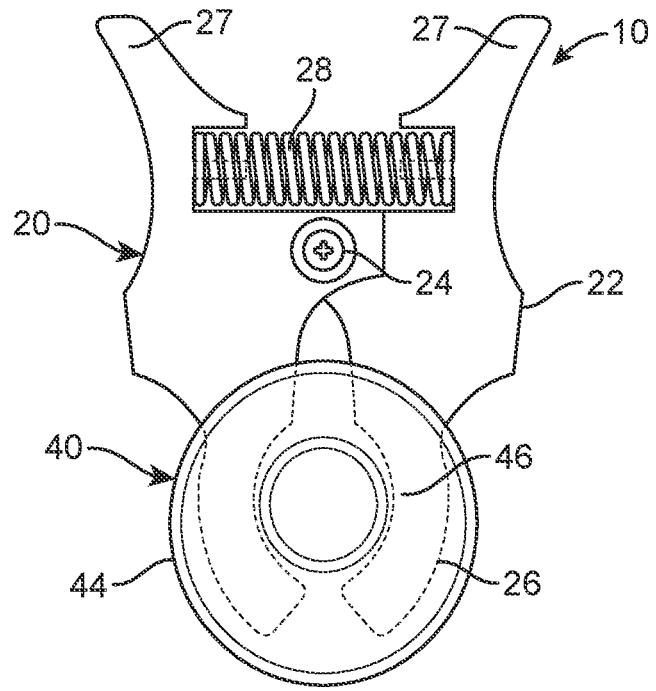
FIG. 5 shows an internal top view of clip assembly 20 inserted within cap assembly 40 in a closed position in accordance to an embodiment of the present invention.
Figure 6:
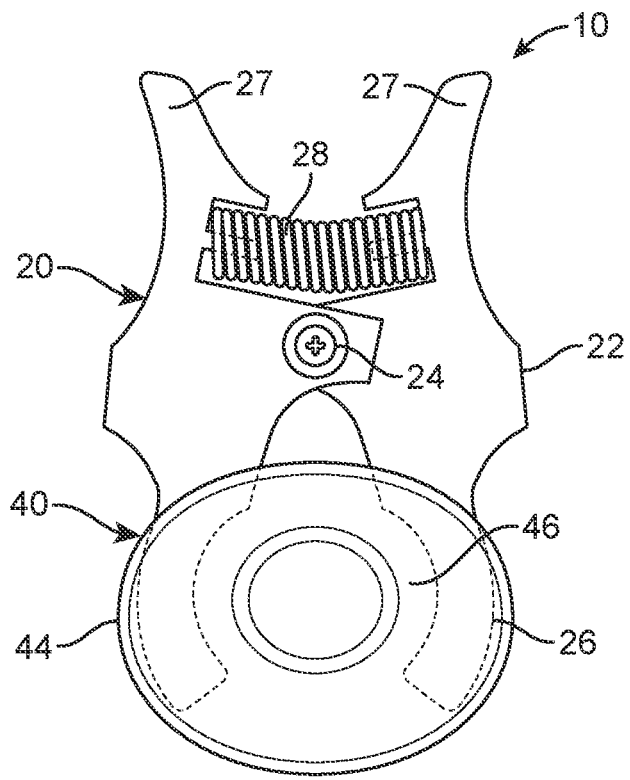
FIG. 6 illustrates an internal top view of clip assembly 20 inserted within cap assembly 40 in an open position in accordance to an embodiment of the present invention.

FIGS. 5 and 6 depict internal sections 26 of clip 22 which are inserted within cap assembly 40. In the present embodiment, both first section 22A and second section 22B are each provided with internal sections 26 which are entirely housed within cap assembly 40. In one embodiment, internal sections 26 are convex members which provide a "C"-shaped configuration. Clip 22 further includes handle sections 27 provided for first section 22A and section 22B. Handle sections 27 are handle members which flaringly extend outwardly from clip 22. Handle sections 27 also provide the necessary gripping structure for a user operating safety cap device 10. In one embodiment, handle sections 27 may be provided with a gripping surface such as rubber which has a high coefficient of friction to allow a user to properly grip safety cap device 10. Other embodiments, may feature handle sections 27 only having a smooth outer surface. Clip 22 further includes a spring 28 which is mounted onto a spring receiving section of clip assembly 20. In the present embodiment, spring 28 is mounted behind hinged connection 24 of clip 22. Spring 28 includes distal ends each having an opening which are received by spring receiving members which protrude from clip 22. As observed in FIGS. 5 and 6, the spring receiving members may be rectangular protrusions which hold spring 28 in place. An expansion force of spring 28 is applied as the spring is mounted to clip 22. The tension results in an outward force which causes the internal sections 26 of the clip to join together and form a closed position as observed in FIG. 5. A user may then apply a compression force to spring 28 in order to compress the spring and engage the clip in an open position as observed in FIG. 6 of the drawings. It should be understood, the present invention features the safety cap device 10 which is constantly in the closed position. The closed position is a resting position. To engage the open position, a user will need to apply a squeezing force to the clip and maintain the squeezing force to the clip.

Cap assembly 40 includes a cap 42 which is made of electrically resistant rubber material. In one embodiment, cap 42 may be provided as a flexible cylindrical cap with a rounded top end which resembles a conical shape. Cap 42 further includes an interior portion which a smooth inner surface that is accessed through an opening of the cap. Additionally, cap 42 further includes a ring surrounding the opening which includes an internal portion 46. In the present embodiment, internal portion 46 receives internal sections 26 therein. As a result, internal sections 26 then surround the opening of the cap internally within the ring. In the present embodiment, cap 42 is mounted to clip 22 such that the rounded end of cap 42 extends downwardly from clip 22 and the opening of cap 42 corresponds with internal sections 26 of clip 22. Furthermore, cap 42 may be of varying height and diameter. The length and diameter of cap 42 may be configured such that it may receive different sizes and lengths of electrical wiring.

Figure 3:
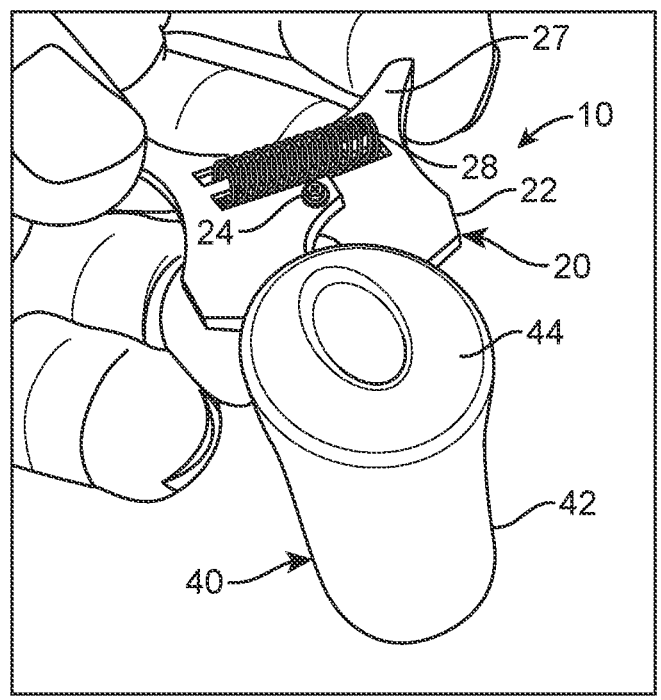
FIG. 3 illustrates an isometric view of safety cap device 10 in a closed position in accordance to an embodiment of the present invention.
Figure 4:
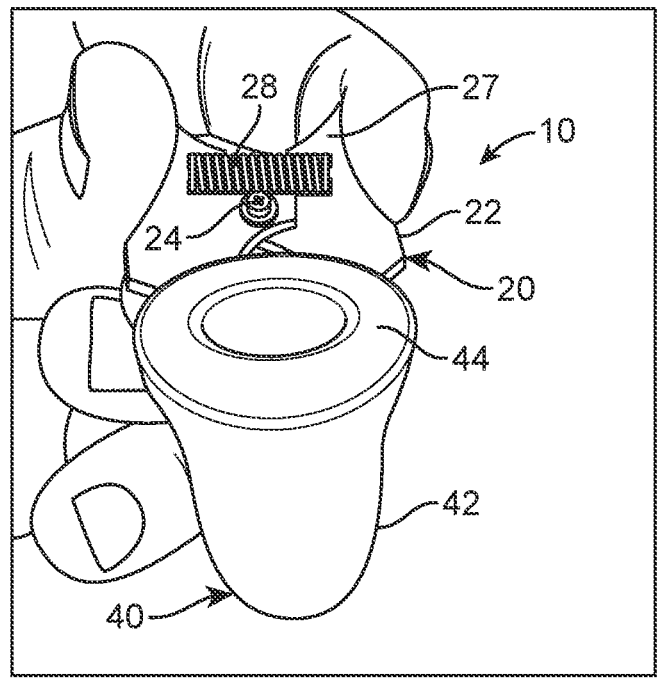
FIG. 4 is a representation of an isometric view of safety cap device 10 in an open position in accordance to an embodiment of the present invention.

As previously stated, the default position of the safety cap device 10 is the closed position which can be observed in a user's hand in FIG. 3. In this figure, the user is merely holding clip 22 without applying any force to the clip. As observed the cap 42 is shown having a squished configuration and the opening of the cap maintains an oval shape representing the contracting force being applied. A user may then grip clip 22 by handle sections 27 and apply a squeezing force. This force then causes spring 28 to be compressed which in turn retracts the internal sections 26 of the clips which then stretches out ring 44 of cap 42. This configuration may be observed in FIG. 4 of the provided drawings. The squeezing force allows a user to engage the open position of safety cap device 10. In order to maintain the open position, the squeezing force must constantly be applied to clip 22. The clip 22 will return to its closed position upon the release of the squeezing force. To utilize the device, a user applies the squeezing force to clip 22. Cap 42 now being in the open position, is then mounted to exposed electrical wiring 50 (as observed in FIG. 1). Once cap 42 has received the exposed wiring therein, the user will then release the squeezing force from clip 22. The release of the squeezing force will engage the closed position which retracts the internal sections 26 of clip 22 together. As a result, the safety cap device 10 will remain securely mounted onto the exposed electrical wiring 50. When a user desires to remove the device from the wiring. They must grip clip 22 to once again engage the open position to easily remove cap 42 from the exposed electrical wiring. The device prevents direct contact with exposed electrical wiring which is common to other electrical wiring caps currently provided.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a safety cap device, comprising:
   a) exposed electrical wiring;
   b) a clip assembly including a clip having a first section and a second section, wherein said first section and said second section each include a concave portion, wherein said clip is a flat structure, wherein said second section overlaps said first section at a middle portion, a hinged connection inserted within said middle section pivotally joining said first section and said second section, wherein said hinged connection is a screw member, said clip further including internal sections, wherein said internal sections are convex members provided for each of said first section and said second section, said internal sections having a "C"-shaped configuration, wherein said clip further includes handle sections provided for each of said first section and said second section, wherein said handle section extends flaringly from said clip, a spring mounted to a spring receiving section of said clip located adjacent to said hinged connection, wherein said spring receiving section includes two spring receiving members being rectangular members which are inserted within distal ends of said spring;
   c) a cap assembly including a cap having a flexible cylindrical shape with a rounded bottom end, wherein said cap includes an interior portion having a smooth surface accessed through an opening of said cap, wherein said cap further includes a ring surrounding said opening, said ring further including an internal portion, wherein said internal portion receives said internal sections of said clip, said internal sections located entirely within said ring and encloses said opening of said cap;
   d) a closed position being a default position, wherein said spring provides an expanding force to said first section and said second section to engage said internal sections to be closed together, said opening having an oval shape when said closed position is engaged; and
   e) an open position engages when a squeezing force is applied to said handle sections of said clip, wherein said squeezing force results in the compression of said spring thereby providing a circular shape to said opening, wherein said cap is mounted onto said exposed electrical wiring.

\* \* \* \* \*